3,591,683
PHARMACEUTICAL COMPOSITION INCLUDING PHENOSULFONIC ACID DERIVATIVE OF TETRACYCLINE AND METHOD OF TREATMENT
Carlos Ferrer Salat, Jorge Ferrer Batles, and Juan Colome Riera, Barcelona, Spain, assignors to Laboratories Ferrer S.L., Barcelona, Spain
Continuation-in-part of application Ser. No. 727,066, May 6, 1968, which is a division of application Ser. No. 477,032, Aug. 3, 1965. This application June 23, 1969, Ser. No. 835,921
Claims priority, application Spain, Aug. 8, 1964, 302,954
Int. Cl. A61k *21/00*
U.S. Cl. 424—227                          6 Claims

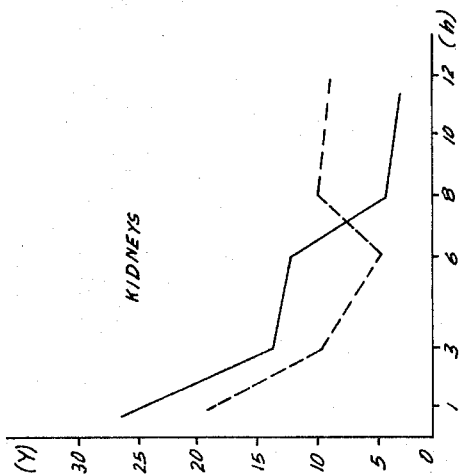
FIG. 3 KIDNEYS
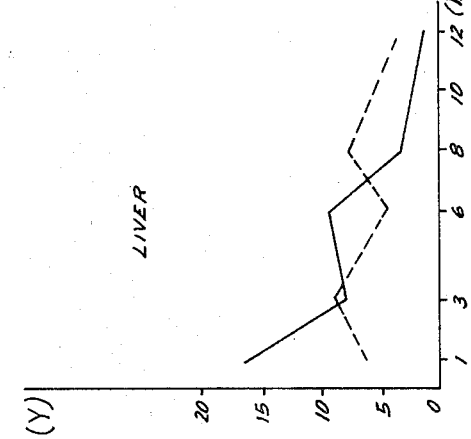
FIG. 2 LIVER
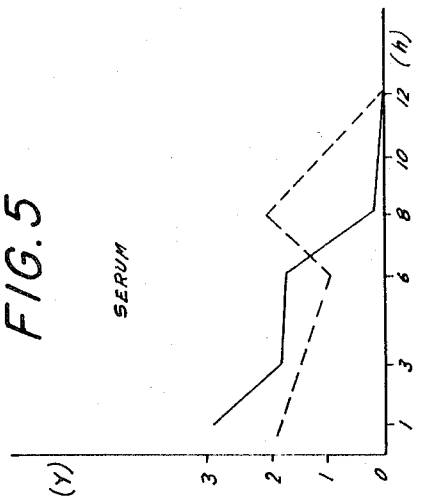
FIG. 5 SERUM
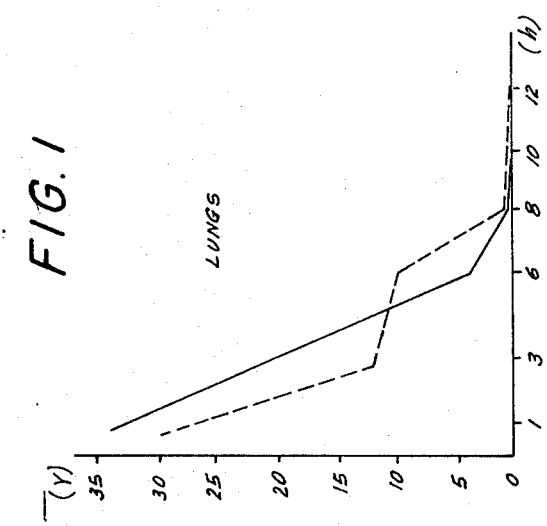
FIG. 1 LUNGS
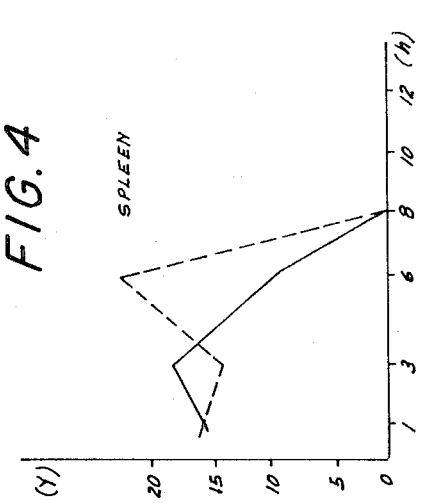
FIG. 4 SPLEEN
TETRACYCLINE GUACOLSULFONATE 200 mg/kg
TETRACYCLINE HYDROCHLORIDE 200 mg/kg

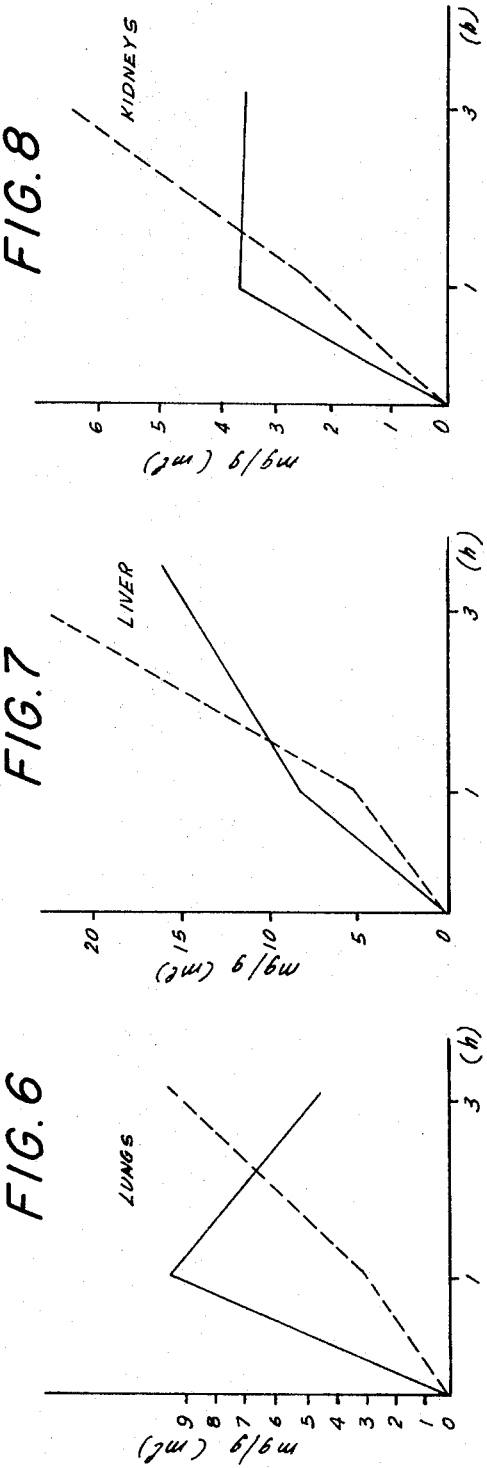
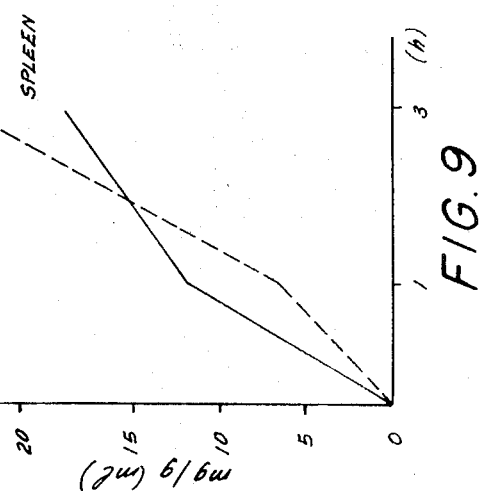

ABSTRACT OF THE DISCLOSURE

A pharmaceutical composition for use in cases of microbial infections comprising a pharmaceutical diluent and a compound of the following formula

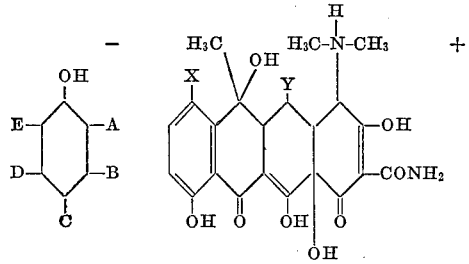

wherein X is hydrogen or chlorine if Y is hydrogen and wherein X is hydrogen if Y is OH, and wherein A is —OCH$_3$ or is hydrogen with the proviso that:
(I) if A is —OCH$_3$, then B and E are hydrogen and one of the two radicals designated C and D is SO$_3^-$ and the other is hydrogen, and
(II) if A is hydrogen, then B is methyl, C is SO$_3^-$, D is hydrogen and E is isopropyl.

The invention also embraces a method of treating a patient suffering from a microbial infection, particularly of the respiratory system, by administering to the patient a pharmaceutical composition as defined.

CROSS-REFERENCES TO RELATED APPLICATIONS

This application is a continuation-an-part of application Ser. No. 727,066 relating to "Modified Tetracycline Composition" filed by the same inventors on May 6, 1968 and now abandoned, which latter application in turn was a division of application Ser. No. 477,032, filed Aug. 3, 1965 now U.S. Pat. No. 3,459,800 by the same inventors for "Process to Produce New Tetracycline Compounds," both applications being assigned to the same assignee as the present application.

BACKGROUND OF THE INVENTION

Tetracycline, which has a broad antibiotic spectrum, is effective against cocci, gram-positive bacilli, numerous gram-negative bacteria, Rickettsia and related virus. The insolubility of the tetracycline bas has led to the clinical use in the form of the hydrochloride which has a better solubility and stability. But this derivative results in a very low pH so that, when administered parenterally and getting into contact with physiologic liquids of neutral pH, the derivatives cause insolubilization of the base with consequent irritation or necrosis of the muscular tissues at the point of injection. Thus, since the compound is histolytic, it is unsuitable for parenteral administration.

When administered orally, the precipitation of tetracycline in the duodenum provokes a local irritating effect, inhibits certain pancreating enzymes, lipase and amylase, and alters the intestinal flora, thus causing side-effects on the digestive system such as vomitting, nausea, gastritis, diarrhea, etc. It also can give rise to serious complications of the digestive tract due to infections by tetracycline-resistant cocci or by fungi, etc., which can even lead to a choleriform syndrome.

It is therefore of utmost interest to avoid occurrence of these side-effects. To this end numerous experiments have been carried out combining the administration of tetracycline with various substances, to promote its absorption in the upper parts of the digestive tract, thus increasing the diffusion of the drug.

Among the experiments with the joint administration of substances that increase absorption of tetracycline there may be mentioned those of Kaplan et al. (1957), who associate tetracycline with phosphates and glucosamine, and those of Einer et al. (1953) who associate it with citric, malic, malonic, tartaric, etc., acids.

New salts of substituted derivatives in the carboxamide group have also been prepared more recently to obtain better absorption and higher blood levels with dimunition of side-effects, such as tetracycline-pyrrolidine, tetracyclinelysine, etc.

All of these investigations aim only at modifying the physico-chemical characteristics without alteration of the therapeutic effect.

In chronic bronchitis there is an inflammatory state in the bronchial mucosa with hyperactivity of the muciparous glands which is responsible for the clinical phenomena of cough, expectoration, etc. and which may cause bacterial superinfection and reaggravation of the disease. These attacks impair the integrity of the pulmonary tissue causing irreversible anatomic lesions, and they lead progressively to a worsening of the cardiorespiratory picture and to actual cardiac insufficiency.

In such cases of chronic bronchitis, administration of tetracycline for a protracted time of 3 to 6 months—as tetracycline is the best tolerated broad spectrum antibiotic and provides higher effectiveness against numerous germs—has achieved an improvement of the clinical symptomatology and a substantial reduction of the aggravations and superadded infections responsible for the progressive impairment of the cardiorespiratory condition.

Other broad-spectrum antibiotics are not recommended in these protracted treatments, due to their lower tolerance and the importance of their side-effects which are often serious.

On the other hand, while in bronchopulmonary affection tetracycline is effective against the microbial agents that cause relapses and aggravations, it is of no effect where an inflammatory condition of the mucosa is responsible for the general symptoms: cough, expectoration, dyspnea, etc.

SUMMARY OF THE INVENTION

It is therefore an object of the present invention to provide for a tetracycline base pharmaceutical composition which is of specific action in the diseases indicated, in particular in diseases, acute or chronic, of the respiratory tract.

It is a further object of the present invention to provide for a tetracycline base pharmaceutical composition having improved properties of solubility, absorption in the body and tolerance.

It is a still further object of the invention to provide for a pharmaceutical composition which combines the beneficial effects on the respiratory tract of compounds such as guaiacol and thymol with the bactericidal action of tetracycline and compounds of the tetracycline family.

Under broad aspects, it is an object of the present invention to provide for a pharmaceutical composition of improved action in case of pulmonary or bronchial diseases, afflictions of the upper respiratory tract, otitis, pharyngitis and also in case of afflictions of the kidneys and pulmonary tract. These objects are met by a pharmaceutical composition comprising a pharmaceutical diluent and a compound of the following formula:

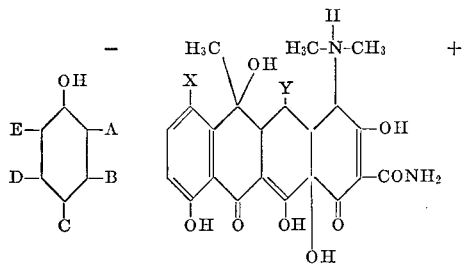

wherein X is hydrogen or chlorine if Y is hydrogen and wherein X is hydrogen if Y is OH, and wherein A is —OCH$_3$ or is hydrogen with the proviso that:

(I) if A is —OCH$_3$, then B and E are hydrogen and one of the two radicals designated C and D is SO$_3^-$ and the other is hydrogen, and (II) if A is hydrogen, then B is methyl, C is SO$_3^-$, D is hydrogen and E is isopropyl.

The invention also embraces a method of treating a patient suffering from a microbial infection by administering to the patient a pharmaceutical composition as defined.

BRIEF DESCRIPTION OF THE DRAWING

FIGS. 1 to 10 show the level of effective tetracycline in the different body organis and the blood serum at different times after administration of (a) tetracycline guaiacol sulphonate (solid lines) and (b) tetracycline hydrochloride (dotted lines).

In FIGS. 1 to 5 the applied dose is 200 mg./kg. at a concentration of 10 mg./ml. in terms of tetracycline.

In FIGS. 5 to 10 the dose is 100 mg./kg.

DESCRIPTION OF THE PREFERRED EMBODIMENTS

The effective ingredient of the pharmaceutical composition of the present invention as indicated is a composition combining a phenolsulfonic acid component with a tetracyclne base component. Its formation is based on a reaction of the SO$_3$H group of a phenolsulfonic acid with the (CH$_3$)$_2$N group of the tetracycline component which thus leads to the formation of an ammonium-type compound.

The general formula of the phenolsulfonic acid-tetracycline combination is as indicated in the above summary, More specifically, the effective ingredient used in the pharmaceutical composition of the invention may be made either by direct reaction of a phenolsulfonic acid and tetracycline in a suitable solvent, and recovery of the final product either by evaporation of the solvent or addition of a second solvent in which the final product is insoluble.

Since these products are not usually available in the free form but only in the form of salts, the reaction may be carried out by starting from the corresponding salts. The inorganic salt formed thereby may be eliminated by insolubilization which can be achieved by choosing a suitable solvent such as water, methyl alcohol, ethyl alcohol, etc. in which the inorganic salt is insoluble. If the inorganic salt is soluble or partially soluble in the polar solvent, a second solvent, in which the inorganic salt is insoluble, should be used.

Whenever the guaiacolsulfonic acid is mentioned in the present description, it should be understood to include also guaiacol-4-sulfonic acid which is an isomer of the guaiacolsulfonic acid, and also mixtures of both.

The method of making the compounds may be illustrated as follows without any intent to limit the invention.

Example I

One mole of tetracycline base was treated with the equivalent quantity of sulfuric acid (49 g.) in 2% aqueous solution. To the solution was added the equivalent amount of calcium guaiacolsulfonate in 5% aqueous solution. This addition was carried out slowly and upon stirring to prevent the CaSO$_4$ crystals formed thereby from occluding the particles of the remaining components.

Stirring was continued for half an hour and the reaction mixture was then immediately concentrated in vacuum at a temperature not over 40° C. to a volume of one liter.

Thereafter, 2 liters of pure ethyl alcohol were added and the thus-formed mixture cooled at 15° C. to precipitate the CaSO$_4$ completely. The thus-formed precipitate was removed by filtration and the filtrate was vacuum evaporated at a temperature not over 40° C. obtaining as a final result 630 g. of tetracycline guaiacolsulfonate.

Example II 0.5 mole of calcium guaiacolsulfonate (224 g.) were dissolved in 1 liter of pure ethyl alcohol and treated with 0.5 mole of pure sulfuric acid. The reaction mixture was then concentrated in vacuum at 40° C. The calcium sulfate formed was filtered off until an aliquot part of the guaiacolsulfonic acid formed remained in the solution.

To one mole of tetracycline base (or oxytetracycline or chlorotetracycline) suspended in 1.5 liters alcohol the equivalent amount of the solution of guaiacolsulfonic acid was added and moderately heated to complete dissolution.

The volume was reduced to one half by vacuum evaporation and the thus-concentrated solution treated with two liters of anhydrous ether which precipitated the product. After cooling at 0° C. and filtration, the product was washed three or four times with ether up to a volume of 500 cc.

By vacuum drying at low temperature, 632 g. of tetracycline guaiacolsulfonate was obtained (or oxytetracycline or chlorotetracycline guaiacolsulfonate, according to the initial starting product).

Example III 5 g. potassium thymosulfonate were dissolved in 15 cc. of methyl alcohol followed by adding the stoichiometric amount of concentrated sulfuric acid.

The product was heated at 55° C. for 5 minutes, allowed to cool, followed by filtration of the precipitate of the potassium sulfate formed and washing with methyl alcohol. An aliquot part of the filtrate was treated with 1 N NaOH using methyl orange as indicator. To the remainder of the solution the corresponding amount of tetracycline was added at the rate of 0.444 g. of tetracycline base per cc. of NaOH required.

The product was heated slightly without exceeding 50° C. for 15 minutes followed by immediate elimination of the alcohol by vacuum evaporation.

The resulting product was washed with ether and vacuucm dried.

The compounds obtained had the following characteristics:

TETRACYCLINE GUAIACOLSULFONATE

Yellow crystalline powder, soluble in water and ethanol, insoluble in ether. The impirical formula is $C_{29}H_{32}O_{13}SN_2$ and the structural formula is:

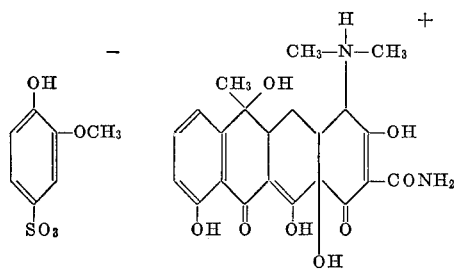

of molecular weight 648.62 and melting point 190° C.

The absorption spectrum in ultraviolet in aqueous solution yielded two well-defined maxima at 276 m$\mu$ and 360 m$\mu$ and two minima at 255 m$\mu$ and 323 m$\mu$.

TETRACYCLINE THYMOLSULFONATE

Solid, crystalline, soluble in ethanol, slightly soluble in benzene and insoluble in ether, of empirical formula $C_{32}H_{38}O_{12}SN_2$ and of structural formula:

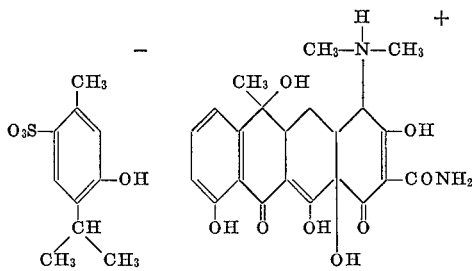

of melting point 195° C.

OXYTETRACYCLINE QUAIACOLSULFONATE

Of empirical formula $C_{29}H_{32}O_{14}SN_2$ and of structural formula:

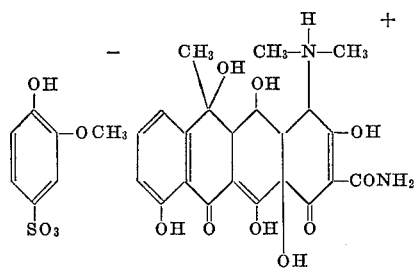

CHLOROTETRACYCLINE QUAIACOLSULFONATE

Of empirical formula $C_{29}H_{31}O_{13}SN_2Cl$ and structural formula:

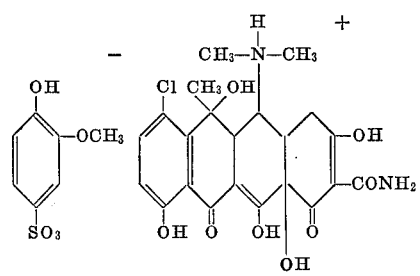

The combined sulfonic acid-tetracycline base preparations were characterized by a specific therapeutical action. For instance, the tetracycline guaiacolsulfonate achieved a synergism between an antibiotic action and an antiphlogistic action of the mucosa of the respiratory system diminishing the bronchial secretions. Thus, the tetracycline guaiacolsulfonate proved to be the ideal antibotic for acute diseases of the respiratory system and for chronic affections. It gave better clinical results than any other drug.

In order to establish the therapeutic value of the drug, a series of pharmacological tests on animals (cats, rats, etc.) and also a series of microbiologic tests were carried out as follows:

The LD 50 in rats, by oral way, of tetracycline guaiacolsulfonate administered by sound, was found to be 4.4±0.3552 g./kg., against 3 g./kg. in case of tetracycline found by Cunningham et al. (Antibiotics Annual 1953–54, 63). The chronic toxicity in rats was determined by administration to a group of rats with an average weight of 103 g. of a daily dose of 400 mg./kg. of tetracycline guaiacolsulfonate for two months. This was compared with a control group. All animals were submitted to the same diet.

Hematologic examination was made before and after the tests, and pathologico-anatomical examination and histological examination of liver, kidneys, suprarrenals, heart, lungs and intestines was carried out after the tests. All examinations showed that there was no noticeable difference between the group of treated animals and that of the control animals.

The weight curve has also been determined, and even though there was some difference between the group of treated animals and the group of control animals, it was of little significance and may have been accidental.

Determination was made of the distribution in the organism of tetracycline guaiacolsulfonate in rats of a dose equivalent to 200 mg. of tetracycline base administered orally using Wood's light technique. The experiments showed the quick distribution of the product through the entire organism as well as a long residence in the same (see also the more detailed test described below).

Intravenous administration to a cat of a dose equivalent to 30 mg./kg. of tetracycline showed no significant changes caused by the drug. Respiration and arterial pressure were not altered. The cardiac rhythm and the cardiogram remained normal. No effect on the activity and the tonus of the smooth musculature was observed.

In order to determine the possible loss of activity of tetracycline upon combining with guaiacolsulfonic acid, the activity of the composition of the invention was compared with the tetracycline hydrochloride as a standard. Microbiologic assays made wtih Bacillus cereus var. mycoid (A.T.C.C. 9634) by the cylinder-plate diffusion method showed an activity of 690 micrograms per mg. Since tetracycline guaiacolsulfonate contains 68.4% of tetracycline, there is no loss of activity.

In order to further evaluate the absorption and activity of the compounds of the present invention, comparative tests were made using tetracycline guaiacolsulfonate as the compound of the invention and using tetracycline hydrochloride as comparative compound. The two compounds were injected separately in rats and the activity of specimens obtained from parts of organs of the animals and from their blood was then determined in relation to a specific bacillus as will be set out presently. Since the activie antibiotic portion is the same in the molecule of the two test compounds, the differences in activity must be due to the remaining moiety of the molecule, that is HCl in case of the tetracycline hydrochloride and the guaiacolsulfonate residue in case of the compound of the invention. These tests then will illustrate both the absorption and the activity thereby obtained.

As test animals there were used male rats with a body weight of between 130 and 150 g., each group of rats consisting of three animals. The animals were sacrificed at 1, 3, 6, 8 and 12 hours after administration of the drug. Accordingly five groups of animals totaling fifteen rats were used for each of the two sample drugs. Additional two animals were used as controls.

The drugs administered were prepared by dissolving each drug in distilled water and diluting it to a concentration of 10 mg./ml. in terms of tetracycline. The dose administered was 200 mg./kg. and the administration was oral. In another test a dose of only 100 mg./kg. was administered, likewise orally.

The animals were then killed by decapitation after the specific periods stated above. Laparotomy was then carried out and the material collected was kept in a freezer.

Since the amount of blood within the tissue frequently involves a point of uncertainty and doubt, the blood was removed to the extent possible after decapitation. The isolated organs were then washed in physiological saline solution and their surfaces were wiped with filter paper. No other manipulation was carried out.

The tissues were then kept in the freezer up to the time of the experiment when they were ground in amounts of 1 g. each and were frozen with a homogenizer and diluted 5 to 10 times with a physiological saline solution. The solution was kept in an ice box overnight to permit uniform dispersion of the drug. It was then centrifuged at 3000 r.p.m. for ten minutes and the supernatant liquid thus obtained was used as the sample drug.

The activity of these thus-prepared sample drugs was then determined in respect of the *Bacillus subtilis*, PCI 219. Two different culture mediums were prepared for cultivating the bacillus as follows:

|  | Base agar, 10 ml. | Seed agar, 5 ml. |
| --- | --- | --- |
| Beef extract, grams | 10 | 10 |
| Peptone, grams | 10 | 10 |
| NaCl, grams | 3 | 3 |
| Agar, grams | 15 | 15 |
| Distilled water, ml | 1,000 | 1,000 |
| pH | 7.2 | 7.2 |

The culture medium was dissolved and kept at a temperature of 50–60° C. 10 ml. of the base agar were then poured into Petri dish having a diameter of 10 mm. and were allowed to settle in the dish. The *Bacillus subtilis* was then added. Following this, 5 ml. per dish of the seed agar was poured over the base agar and also allowed to settle.

The seed agar was adjusted so as to contain at the time of the experiment 10,000 spores of the *Bacillus subtilis* per milliliter or 5,000 spores per plate.

After the medium containing the bacillus had been placed on plates, the test drugs were added. Cultivation was carried out immediately in an incubator at a temperature of 37° C. for 16 to 20 hours. Following this, the inhibitive zones which had formed were measured accurately up to 0.5 mm.. in diameter and the average was obtained. A standard curve was drawn for this purpose and on semilogarithmic paper with the integral scale used for the inhibitive zones and the logarithmic scales used for the concentrations. The relative concentrations of the sample drugs were thus obtained from the standard curve depending on the degrees of inhibition.

Thus, comparing the different inhibitory action of the two drugs based on the diameter of the inhibition halo of the bacillus, the absorption and activity of the two drugs could be determined.

The results are shown in FIGS. 1 to 5, based on a concentration expressed in γ relative to a time from 1 to 12 hours. The different organs and the use of the blood serum are indicated in the drawings.

The tests of FIGS. 6–10 were carried out in a similar way. However, the culture medium in this case was composed as follows:

|  | Base agar, 10 ml. | Seed agar 1 ml |
| --- | --- | --- |
| Peptone, grams | | 6 |
| Beef extract, grams | | 1.5 |
| Yeast extract, grams | | 3 |
| K₂HPO₄, grams | 2.7 | |
| Agar | 15 | 15 |
| Distilled water, ml | 1,000 | 1,000 |
| pH | 5.7 | 5.7 |

In each case in the second series of tests each plate was prepared to contain 200,000 spores of *Bacillus subtilis*. In the drug a buffer was used in the form of $\frac{1}{10}$ M phosphate buffer (pH 4.5) for preparing the solution.

In the tests of FIGS. 6–10 the concentration was determined in MCG/g. or ml. and the curves were established regarding period of time from 1 to 3 hours only.

The tests clearly indicate the level of effective tetracycline after administering tetracycline guaiacolsulfonate was higher during the important period of the first 1–8 hours, and in particular during the period of 1–6 hours, then obtained with tetracycline hydrochloride. From this it can be concluded that the drug of the invention was absorbed more quickly, which clearly was due to the fact that the invention is more soluble and therefore easier to absorb than the tetracycline hydrochloride. Therapeutically this shows that higher curative levels of tetracycline are reached in a shorter period of time with compounds of the invention than with tetracycline hydrochloride.

In the light of the pharmacological results obtained and verified further in human tests, it is obvious that tetracycline guaiacolsulfonate is a product of extraordinary therapeutic value characterized by its great power of diffusion, long residence in the organism, high tolerance and lack of noticeable undesirable side effects.

The drug can be administered in the usual pharmaceutical forms such as coated tablets, syrups, suppositories, etc., alone or associated with other drugs, since none of the tests of the composition of the invention, prepared in any of the pharmaceutical forms, showed any noticeable loss of activity.

Preferably, the drug is administered to the patient orally or intravenously. The preferred dose per day for either administration is between 250 and 2000 mg. for an adult. For children the dose will depend on the age and may be half the dose for adults.

To further illustrate the making of the effective ingredient, 2-methoxyphenolsulfonate of 4-dimethylamino-1,4,4a,5a,6,11,12,12a-octahydro - 3,6,10,12a - pentahydroxy-6-methyl-1,11-dioxo - 2 - naphthacenecarboxamide having the structural formula

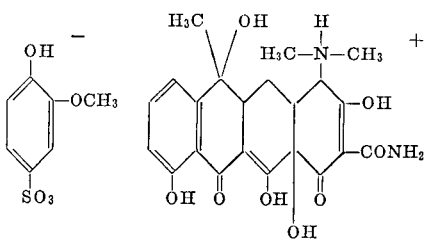

may be formed by reacting the balsamic and tetracyclinic components thereof in equimolar proportions.

It is also possible to react guaiacolsulfonic acid and tetracycline in a suitable medium in which both compounds, as well as the reaction products thereof, are soluble. A preferred solvent or medium for this purpose is ethyl alcohol. The reaction product is then recovered by evaporation of the solvent under vacuum with mild heating, followed by recrystallization of the product.

The process may also be carried out by introducing into the reaction solution mentioned in the preceding paragraph a solvent in which the reaction product is not soluble, preferably ordinary ethylether. This will cause precipitation of the reaction product which then may be recovered by filtration and recrystallization.

Tetracycline guaiacolsulfonate may also be produced by reacting a salt of guaiacolsulfonic acid, preferably the barium salt thereof, with a tetracycline salt such as the sulfate, in a medium such as water in which the inorganic salt formed of the cation of the guaiacolsulfonic acid salt and of the anion of the tetracycline salt is insoluble, thereby, for instance, precipitating barium sulfate. The thus-formed precipitate is then removed, for example by filtration, and the tetracycline guaiacolsulfonate may then be recovered by vacuum evaporation of the solvent and recrystallization.

Tetracycline guaiacolsulfonate may be likewise produced by reacting a salt of guaiacolsulfonic acid such as the sodium or potassium salt or preferably the calcium salt, with a tetracycline salt such as the sulfate, in a solvent common to both and in which the inorganic salt formed by the reaction is also at least partly soluble. This is followed by adding a solvent such as alcohol in which the inorganic salt formed by the reaction is insoluble, so that the inorganic salt will be precipitated and can then be removed by filtration. The residual solution is then evaporated under vacuum in order to recover the tetracycline guaiacolsulfonate which may be purified by recrystallization.

The above-mentioned guaiacolsulfonic acid may be any one or a mixture of several of the isomers of the guaiacol 4-sulfonic acid.

In a manner similar to that described above with respect to producing tetracycline or oxytetracycline or chlorotetracycline guaiacolsulfonate, it is also possible to produce the corresponding tetracycline thymolsulfonates, for instance by reaction of thymolsulfonic acid with tetracycline or the like in a suitable solvent, preferably methyl alcohol and vacuum evaporation of the solution under moderate heating.

The pharmaceutical compositions of the invention combine the balsamic tetracycline compound with conventional suitable excipients, particularly those suitable in connection with the treatment of diseases of the respiratory tract such as chronic and acute bronchitis, and diseases of the urinary passages.

What is claimed as new and desired to be protected by Letters Patent is set forth in the appended claims.

1. A pharmaceutical composition for use in cases of microbial infections responsive to tetracycline treatment comprising an effective amount of a compound of the following formula:

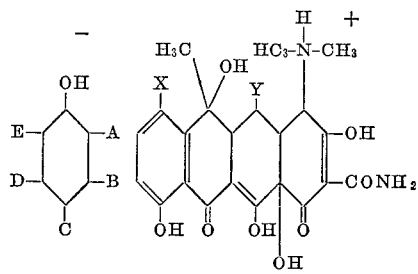

wherein X is hydrogen or chlorine if Y is hydrogen and wherein X is hydrogen if Y is OH, and wherein A is —$OCH_3$ or is hydrogen with the proviso that:

(I) if A is —$OCH_3$, then B and E are hydrogen and one of the two radicals designated C and D is $SO_3^-$, and the other is hydrogen, and (II) if A is hydrogen, then B is methyl, C is $SO_3^-$, D is hydrogen and E is isopropyl, together with a pharmaceutically acceptable excipient therefor.

2. The pharmaceutical composition of claim 1, wherein the said compound is selected from the group consisting of tetracycline guaiacolsulfonate, oxytetracycline guaiacolsulfonate, chlorotetracycline guaiacolsulfonate, tetracycline thymolsulfonate, oxytetracycline thymolsulfonate and chlortetracycline thymolsulfonate.

3. A method of treating a patient suffering from an infection caused by microbial organisms which are responsive to treatment with tetracycline, the said method comprising the step of administering to the patient, in an amount effective in destroying or inhibiting said organisms, a composition as defined in claim 1.

4. The method of claim 3 wherein the said composition contains, in said effective amount, at least one compound selected from the group consisting of tetracycline guaiacolsulfonate, oxytetracycline, guaiacolsulfonate, chlortetracycline guaiacolsulfonate, tetracycline thymolsulfonate, oxytetracycline thymolsulfonate and chlortetracycline thymolsulfonate.

5. The method of claim 3 wherein the said composition is administered orally to the patient at a dose between about 250 and 2000 mg. per day for adults and about half that dose for chlidren.

6. The method of treating a patient by the method defined in claim 3 wherein the said composition is administered to the patient intravenously at a dose between about 250 and 2000 mg. per day for adults and about half that dose for children.

References Cited
UNITED STATES PATENTS
3,242,235    3/1966    Riffkin et al. _____ 424—227

JEROME D. GOLDBERG, Primary Examiner